United States Patent [19]

Goebel et al.

[11] 4,256,634
[45] Mar. 17, 1981

[54] IRON COMPLEX AZO DYESTUFFS

[75] Inventors: Hermann Goebel; Kurt Eitel, both of Leverkusen, Fed. Rep. of Germany

[73] Assignee: Bayer Aktiengesellschaft, Leverkusen, Fed. Rep. of Germany

[21] Appl. No.: 12,947

[22] Filed: Feb. 16, 1979

[30] Foreign Application Priority Data

Feb. 18, 1978 [DE] Fed. Rep. of Germany ....... 2806950

[51] Int. Cl.³ .............................................. C09B 45/14
[52] U.S. Cl. .................................................... 260/149
[58] Field of Search ......................................... 260/149

[56] References Cited

U.S. PATENT DOCUMENTS

| 2,843,580 | 7/1958 | Straley et al. | 260/149 |
| 4,120,854 | 10/1978 | Wicki | 260/149 |
| 4,123,428 | 10/1978 | Holliger et al. | 260/149 |

FOREIGN PATENT DOCUMENTS 1142560 2/1969 United Kingdom ............ 260/149 UX

OTHER PUBLICATIONS

Georgievics et al., "A Textbook of Dye Chemistry", Scott Greenwood and Son, 1920, p. 111.

*Primary Examiner*—Paul F. Shaver
*Attorney, Agent, or Firm*—Sprung, Felfe, Horn, Lynch & Kramer

[57] ABSTRACT

Iron complexes of azo dyestuffs of the formula

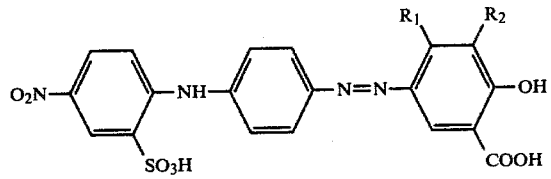

wherein
$R_1$ and $R_2$ have the meaning indicated in the description, and their use for dyeing or printing various fibre materials, for example wool, silk and synthetic materials such as Perlon, but especially leather. The dyeings obtained are distinguished by good fastness properties.

2 Claims, No Drawings

IRON COMPLEX AZO DYESTUFFS

The present invention relates to iron complexes of azo dyestuffs of the formula

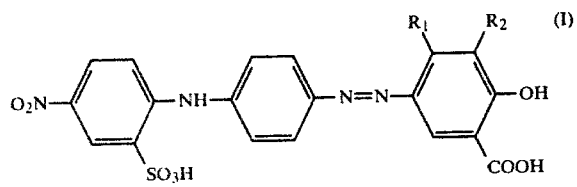

wherein
$R_1$ = H, $SO_3H$ or alkyl and
$R_2$ = H or alkyl,
and a process for their preparation and their use for dyeing and printing natural and synthetic fibre materials.

Preferred alkyl groups are those with 1–4 C atoms, in particular $CH_3$.

The dyestuffs themselves are obtained by diazotising 4'-nitro-4-amino-diphenylamine-2'-sulphonic acid and coupling the product to salicylic acid or derivatives thereof in an alkaline medium. Conversion into the iron complex is effected in a manner which is in itself customary, by heating an aqueous or organic-aqueous solution of the dyestuffs with an iron-III salt, for example iron-III chloride, iron-III sulphate, iron formate or iron acetate, it being very appropriate to add Na acetate, at a weakly acid PH value. When formation of the iron salt has ended, the iron complex dyestuff is precipitated by salting out and is then isolated. 0.5–1 mol of iron salt are generally used per mol of dyestuff.

For formation of the iron complex, the starting dyestuffs can be used either in the form in which they are isolated beforehand, or from the coupling solution without intermediate isolation.

The new dyestuffs obtainable according to the process are valuable products which are suitable for dyeing or printing various fibre materials, for example those of wool, silk and synthetic materials such as Perlon, but are especially suitable for leather. The olive-tinged brown dyeings obtained are distinguished by good fastness properties. These dyestuffs are suitable both for dyeing chrome upper leather and for dyeing upholstery leather and clothing leather. All types of suede can also be dyed well with the new dyestuffs. Their capacity to build up on heavily retanned leathers without the shade being shifted to unpleasant corinth hues is also particularly remarkable. The formula indicated is that of the free acid. The dyestuffs are generally employed in the form of their salts, for example their alkali metal salts, in particular their sodium salts.

EXAMPLE 44.8 g of 4'-amino-diphenylamine-2'-sulphonic acid are diazotised in the customary manner and the diazotisation product is coupled to 20 g of salicylic acid in a medium rendered alkaline with sodium carbonate.

After the coupling reaction has ended, the dyestuff is separated out at about pH 6.0–7.0 with the aid of sodium chloride and then filtered off.

The paste is dissolved in 600 ml of water having a temperature of 60° C. After sodium acetate has been added, 30 g of iron-III chloride (60% pure material) are sprinkled in at pH 7.0. The dyestuff solution is heated to 98° C. It is adjusted to pH 3.0–4.0, sodium chloride is added and the product is isolated at 40° C. The dyestuff obtained is suitable for dyeing and printing wool, silk, leather and synthetic materials such as, for example, Perlon® in golden yellow to olive-tinged light brown shades.

The iron complex can also be formed without intermediate isolation of the metal-free dyestuff. If o- or m-cresotic acid or sulphosalicylic acid is used instead of salicylic acid, dyestuffs with similar colour shades and properties are obtained.

We claim:
1. Iron complexes of azo dyestuffs of the formula

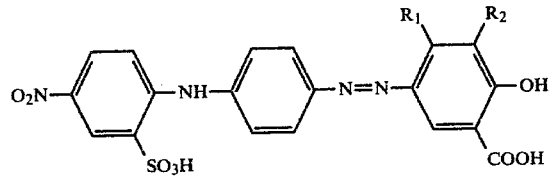

wherein
$R_1$ = H, $SO_3H$ or alkyl and
$R_2$ = H or alkyl
2. The iron complex of the azo dyestuff of the formula

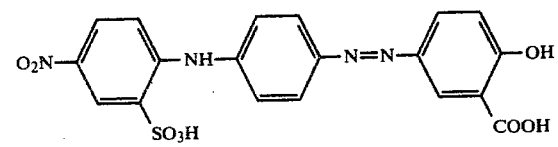

* * * * *